United States Patent Office 3,623,164
Patented Nov. 30, 1971

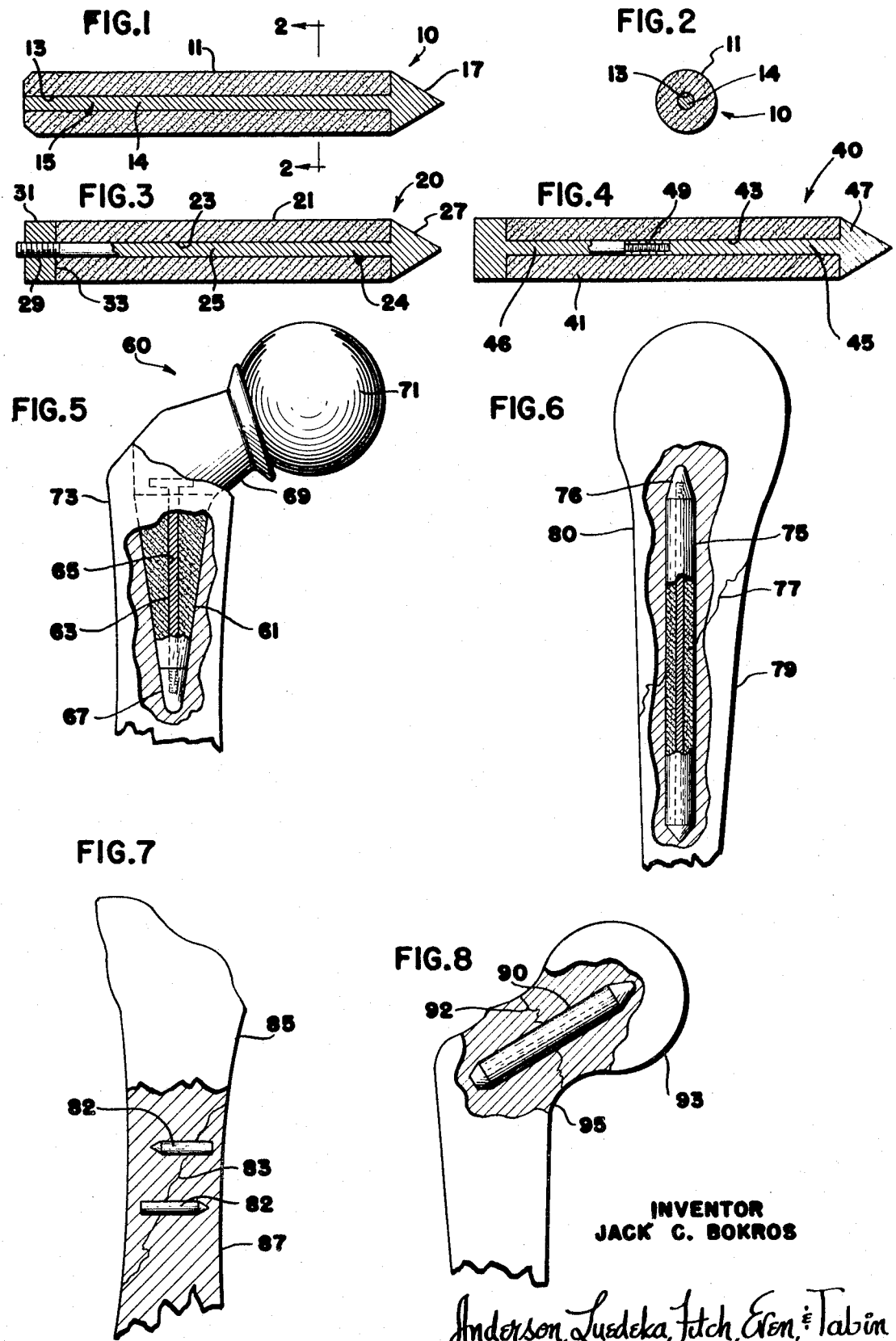

3,623,164
PROSTHETIC DEVICE
Jack C. Bokros, San Diego, Calif., assignor to
Gulf Oil Corporation
Filed Oct. 6, 1969, Ser. No. 863,959
Int. Cl. A61f 1/00
U.S. Cl. 3—1
11 Claims

ABSTRACT OF THE DISCLOSURE

A prosthetic device designed for implantation in broken bones. An inner rod member of high-strength metallic alloy having a high modulus of elasticity is disposed within an outer sleeve member of carbon having a low modulus of elasticity. The carbon sleeve is bonded or friction-fitted to the inner rod, or it may be prestressed between an enlarged head at one end of the rod and a nut. The composite unit has a modulus of elasticity closely approximating that of living bone which allows the unit to remain securely implanted and not be displaced through toggling.

---

The present invention relates generally to prosthetic devices and, more particularly, to synthetic structures which strengthen or replace sections of broken bones.

It is well known that use of prostheses for joints and the strengthening of fractured bones during healing has become commonplace in modern medical practice. Many parts of the skeletal system, especially those which bear the main weight of the body, are subject to great stress. When broken, these bones are difficult to heal rapidly and correctly. Morevore, the damage and deterioration of weight-bearing and other joints, such as the hip joint due to disease and other trauma often cannot be prevented and result in immobility for the patient. The adaptation of artificial devices to replace and strengthen damaged bones has alleviated many of such problems.

The prosthetic devices available today, however, are subject to many limitations. Many of these devices are themselves vulnerable to deterioration from chemical and galvanic corrosion. Such corrosion results in reduced strength of the prosthetic device and probable toxic reaction of the host tissues to the corrosion products. The devices are therefore generally only temporary until they are removed or replaced. Also, use of foreign materials which are stronger but less flexible than living bone causes an implanted bone pin or replacement device to have movement relative to the bone under prolonged conditions of stress. This movement can cause such a pin to work loose from the bone and lose its effectiveness as a strengthening device.

In order to overcome these disadvantages, it is an object of the present invention to provide a prosthetic device which closely approximates the rigidity of living bone.

It is another object of this invention to provide a device which is chemically inert within and completely compatible with a living body.

It is a still further object to provide a combination of materials from which a number of different prosthetic devices for use in many areas of the body may be produced. These and other objects of the invention are more particularly set forth in the following detailed description and in the accompanying drawings wherein:

FIG. 1 is a cross-sectional view illustrating a bone pin embodying various features of the present invention;

FIG. 2 is an enlarged, cross-sectional view taken along line 2—2 of FIG. 1;

FIG. 3 is a cross-sectional view of another bone pin embodying various features of the present invention;

FIG. 4 is a cross-sectional view of still another bone pin embodying various features of the present invention;

FIG. 5 is an elevational view of another device embodying various features of the invention shown implanted in the femur with portions broken away and shown in cross-section;

FIG. 6 is a variation of the device illustrated in FIG. 3 shown in position in one type of bone fracture, with portions broken away and shown in cross-section;

FIG. 7 is an illustration of a bone fracture wherein a pair of bone pins are used, with portions broken away and shown in cross-section; and FIG. 8 is an illustration of a third type of bone fracture where a bone pin is employed, with portions broken away and shown in cross-section.

In FIG. 1, a composite bone pin 10 is illustrated having an outer cylindrical sleeve 11 of a suitable hard carbonaceous material having a low modulus of elasticity. A longitudinal opening or central passageway 13 is formed, as by machining, within the sleeve 11 in order to accommodate a rod portion 14 of an inner member 15. An enlarged head 17 is formed at one end of rod 14. The head 17 abuts one end surface of sleeve 11 and may be variously shaped to accommodate the particular application contemplated for the bone pin 10. The inner member 15 is made of a suitable, biocompatible metallic alloy having a high modulus of elasticity, preferably Vitallium.

The rod portion 14 is bonded or friction-fitted to the surface defining the longitudinal passageway through the sleeve 11. The combined sleeve and rod materials produce a composite bone pin 10 having a relatively low modulus of elasticity which closely approximates that of living bone. The modulus of elasticity, also known as Young's modulus, is the common engineering measurement of stiffness or rigidity in elastic materials. It is the equivalent of the ratio of stress to corresponding strain for a given loading and is measured in the same units as stress, pounds per square inch (p.s.i.). By matching the modulus of elasticity of the bone pin 10 to that of living bone, the chance of relative movement occurring therebetween is substantially reduced.

The sleeve 11 may be made from a material having a modulus of elasticity about equal to, or preferably slightly less than that of living bone, which material is compatible with the body. Examples of suitable materials include carbon materials, e.g. polycrystalline graphite (such as that sold under the trade name Poco Graphite), vitreous amorphous carbon, pyrolytic carbon, and a composite of carbonized cloth and thermosetting resin. Pyrolytic carbon may be obtained by the high temperature decomposition of gaseous hydrocarbons to deposit carbon of suitable physical characteristics onto a cylindrical mandrel of material which is stable at high deposition temperatures. After deposition of the carbon, the mandrel may be machined away leaving only the pyrolytic carbon sleeve, if desired. A sleeve of cloth and carbonized thermosetting resin may be obtained by impregnating a suitable cloth, e.g. rayon or carbon, with an organic thermosetting resin and molding the impregnated cloth to the desired shape. Subjection to a high-temperature, oxygen-free atmosphere causes pyrolysis or carbonization which leaves a carbonized composite residue. Experimental evidence indicates that high-purity carbon, including polycrystalline graphite, is chemically, biologically and physically compatible with the fluids and tissues in the human body over extended periods of time. Usually carbonaceous materials are selected which have a modulus of elasticity between $1 \times 10^6$ and $4 \times 10^6$ p.s.i. and a porous outer surface approaching that of living bone.

The longitudinal passageway 13 in the sleeve 11 accommodates the inner metallic rod portion 14 in a location coaxially within the sleeve. In the illustrated embodiment, the longitudinal passageway 13 extends completely through sleeve 11. However, the passageway 13 may be drilled to terminate slightly short of one end of the sleeve 11 so that one end of the pin would be completely carbonaceous. The rear surface of the head 17 is flat and perpendicular to the rod 14 to abut the end surface of sleeve 11. The front surface of the head 17 may be machined into various shapes, and the conical shape of head 17, illustrated in FIG. 1, facilitates insertion of the bone pin 11, for example, within a hole drilled in the marrow of a fractured bone.

The carbon sleeve 11 may be bonded to an inner rod 14 of Vitallium using any adhesives suitable for bonding carbon to metal. Depending upon the material from which the sleeve 11 is made, it may also be bonded to the rod 14 by heating to a temperature to form a metal carbide bond at the surface therebetween. It is also contemplated that sleeve 11 may be friction fitted over rod 14.

The inner member 15 may be machined from suitable biocompatible metals or metallic alloys, such as Vitallium, titanium alloys and stainless steel. The inner metallic rod portion 14 supplies structural strength and internal support to a carbonaceous sleeve 11 because of its greater elastic modulus and relatively high tensile strength. In this respect, the inner member should be made from a material having a tensile strength of at least about 50,000 p.s.i. Generally, the inner member will be made of a material having a modulus of elasticity at least about $10 \times 10^6$ p.s.i. In order to keep the modulus of elasticity of the composite bone pin in the desired range of that of living bone, i.e. between about 2 and $4 \times 10^6$ p.s.i., the inner member is usually not made from a material having a modulus higher than about $30 \times 10^6$ p.s.i.

To achieve the desired relatively low modulus of elasticity for the composite bone pin 10, the relatively high modulus metallic portions are disposed close to the central axis of the outer member or sleeve 11. Generally, the diameter of the rod portion is not greater than about 50 percent of the outer diameter of the sleeve. For example, when a sleeve 11 of constant diameter is used, the rod portion 14 will be coaxial and will have a diameter of approximately ⅓ to ¼ that of the outside diameter of the sleeve 11. The exact ratio of diameters will be a function of the specific metallic and carbonaceous materials employed, to form a composite device whose modulus of elasticity approximates that of living bone. As shown in FIG. 2, the metallic rod 14 is disposed coaxially within carbonaceous sleeve 11 and has a diameter approximately ⅓ the outside diameter of sleeve 11.

FIG. 3 illustrates a bone pin 20 which is similar to the bone pin 10 to the extent that it includes a carbonaceous sleeve 21 having a central passageway 23 extending longitudinally therein which is coaxial with the sleeve. An inner member 24 has a metallic rod portion 25 that fits through the sleeve passageway 23 and an enlarged cone-shaped head 27, the rear surface of which abuts the end surface of the sleeve 21. The sleeve 21 is made from a suitable carbon material having a low modulus of elasticity, and the inner member 24 is made of a suitable biocompatible alloy having a high modulus of elasticity. The opposite end 29 of the rod 25, from that where the head 27 is disposed, is threaded and extends beyond the end of sleeve 21. A nut 31 is received on the threaded end 29 and is drawn up until it abuts the opposite end surface of sleeve 21, which surface is perpendicular to the sleeve axis. As the nut 31 is tightened, the sleeve 21 is placed in compression while the rod portion 25 is placed in tension.

Because carbonaceous materials are substantially stronger when placed in compression, the prestressing utilized in pin 20 causes the carbon sleeve 21 to be structurally stronger and less prone to fracture. The nut 31 may have various shapes but generally is designed to abut and lie flush against the adjacent end of the sleeve 21. To best accomplish this, a front surface 33 of the nut 31 is disposed perpendicular to the threaded hole therethrough and has a smooth finish to allow the nut 31 to be tightened without interference.

FIG. 4 illustrates bone pin 40 which is generally similar to the bone pin 20 inasmuch as it employs an outer sleeve 41 that is placed in compression. The rod which extends through a longitudinal passageway 43 in the sleeve 41 is made up of front and rear sections 45 and 46, respectively, which engage each other within the longitudinal passageway 43 in the sleeve 41. The front section 45 has a conical head 47, and the rear section 46 has an end portion generally the size and shape of the nut 31. External threads 49 at the forward end of the rear rod section 46 are received in a threaded hole at the rear end of the front rod section 45. This arrangement locates the threaded engagement within longitudinal passageway 43 where it is shielded from direct contact with the body fluids and materials.

By combining biocompatible materials so as to locate the large volume, relatively low modulus carbon symmetrically about the small volume, relatively high modulus metalic alloy, one can produce a composite device having a modulus of elasticity only slightly above that of the outer member, and very close to the modulus of living bone. Calculation of the approximate combined modulus may be accomplished by use of the following formula for Young's modulus:

$$E_{composite} = \frac{E_{rod}I_{rod} + E_{sleeve}I_{sleeve}}{I_{total}}$$

where:

$E_{composite}$=Young's modulus of bone pin
$E_{rod}$=Young's modulus of inner rod
$E_{sleeve}$=Young's modulus of outer sleeve
$I_{rod}$=Moment of inertia of inner rod
$I_{sleeve}$=Moment of inertia of outer sleeve
$I_{total}=I_{rod}+I_{sleeve}$=Moment of inertia of bone pin The magnitude of the moment of inertia is dependent upon the distance of the mass from the axis about which the moment is measured, and the moduli of the rod and the sleeve are determined by the material chosen. Thus it can be seen that the combined modulus of elasticity of the bone pin is primarily dependent upon the distance each of the high and low modulus materials used in the pin are disposed from the common longitudinal axis. If a high modulus metallic alloy is concentrated closely about the axis and a considerably larger volume of the low modulus carbon is disposed farther out from that same axis, the product of $E_{sleeve}$ and $I_{sleeve}$ will dominate the equation, producing a combined modulus very close to that of the sleeve material. In this manner, the modulus of the composite bone pin is matched to the relatively low modulus of living bone, i.e. about $2 \times 10^6$ to $4 \times 10^6$, while taking advantage of the structural strength of the metallic rod.

FIG. 5 illustrates a prosthesis 60 designed as a replacement for the upper portion of the femur which includes the ball section of the ball-and-socket hip joint. Prosthesis 60 comprises an outer member 61 in the shape of a truncated cone of a material such as high-purity carbon. An inner member in the form of a rod 63 extends through a passageway 65 disposed along the axis of the sleeve 61. A threaded nut 67 of a metallic alloy, the same as that from which the rod 63 is made, is received on the threaded end portion of the rod. The opposite end of the rod 63 is embedded in a synthetic neck 69 member which is integral with a head or ball portion 71, both of which are formed from a suitable material, such as Vitallium, a titanium alloy, or stainless steel. The prothesis 60 is designed so the outer member 61 and the nut 67 are located within a remaining fragment 73 of living bone to form an anchor for the neck and ball members 69, 71. Because the portion of the prosthesis 60 embedded in the bone has a rigidity closely approximating the rigidity of natural living bone, an excellent anchor is provided. The carbonaceous material from which the outer member 61 is made is conducive to bone growth, and thus its presence induces acceptance of the replacement prosthesis 60 as a permanent section of the joint.

FIGS. 6 through 8 generally illustrate some examples of practical applications which may be made of bone pins, such as the pins 10, 20 or 40. FIG. 6 shows a relatively long pin 75 which is disposed within the bone marrow and extends a sufficient distance on either side of a break 77 to carry the full loading from the undamaged area of one bone fragment 79 to the undamaged area of the other fragment 80. The bone pin 75 is similar to the pin 20 shown in FIG. 3, except for a conical nut 76 which is employed to facilitate its insertion. It is contemplated that the pin 75 would be inserted by drilling the bone from the end nearest the break, inserting the pin longitudinally and then filling the end of the drilled hole.

FIG. 7 illustrates securing two bone fragments by utilizing two relatively short pins 82 disposed transversely of a bone which has suffered an oblique fracture 83. Disposition of the pins 82 in this manner prevents longitudinal as well as lateral movement of bone fragments 85 and 87.

FIG. 8 shows a composite bone pin 90 which is disposed centrally within the neck of a femur to secure a relatively rare fracture 92 suffered between the head 93 and the neck 95. Close approximation of the modulus of living bone is considered particularly critical in this application because the femur, and especially the neck of the femur 95, is one of the main weight-bearing bone regions in the body. Stress on the pin 90 will be great, and there will be a considerable tendency for toggling of the pin, i.e., separation of the pin from the bone.

The biocompatibility and corrosion resistance of the composite pin in all of these applications allows it to remain permanently within the bone unless other physiological factors dictate otherwise. As long as the prosthesis is in place, it will perform very much like natural bone because of its similar rigidity and because it is conducive to new bone growth.

The following example illustrates one combination of a high-purity, low modulus carbon sleeve and a high strength, high modulus metallic alloy to form a prestressed, biocompatible, composite bone pin which performs excellently in the human body.

EXAMPLE

A composite bone pin of the type shown in FIG. 3 is constructed from a sleeve of polycrystalline graphite (sold under the trade name Poco AC Graphite) having a length of about 6 inches and an outer diameter of about 0.5 inch. This graphite has a density of about 1.9 g./cm.$^3$ and an average crystallite size ($L_c$) of about 300 A. The isotrophy of the graphite, measured by the method of Bacon (Journal of Applied Chemistry, 1956, volume 6, p. 477) is nearly 1.0, with 1.0 being perfectly isotropic carbon on the Bacon scale The carbon sleeve fits over a 0.2 inch diameter rod portion of an inner member having a conical head at one end. The inner member is made of Vitallium, a cobalt-chromium alloy having a specific gravity of 8.29 and a tensile strength greater than 100,000 p.s.i. By tightening a threaded Vitallium nut at the opposite end of the rod, the sleeve is placed under compression of about 2000 p.s.i. The combined modulus of elasticity of the composite bone pin is calculated in Table I.

TABLE I $$E_{composite} = \frac{E_{rod} I_{rod} + E_{sleeve} I_{sleeve}}{I_{total}}$$

$E_r = E_{rod} =$ Young's modulus of inner metallic rod (Vitallium $= 30 \times 10^6$ p.s.i.)
$E_c = E_{sleeve} =$ Young's modulus of sleeve (carbon) $= 1.7 \times 10^6$ p.s.i.
$r_1 = 0.1 = 1 \times 10^{-1}$ inches (radius of rod)
$r_2 = 0.25 = 2.5 \times 10^{-1}$ inches (radius of outer surface of sleeve)

For a circular cross-section $$I = \frac{\pi r^4}{4}$$

$$I_1 = I_{rod} = \frac{\pi (r_2)^4}{4} = \frac{\pi (1 \times 10^{-1})^4}{4} = \frac{\pi}{4}(10^{-4})$$

$$I_2 = \frac{\pi (r_2)^4}{4} = \frac{\pi (2.5 \times 10^{-1})^4}{4} = \frac{\pi}{4}(42 \times 10^{-4})$$

$$I_{sleeve} = I_2 - I_1 = \frac{\pi}{4}(42 \times 10^{-4}) - \frac{\pi}{4}(10^{-4})$$

$$= \frac{\pi}{4}(42 \times 10^{-4} - 1 \times 10^{-4})$$

$$= \frac{\pi}{4}(41 \times 10^{-4})$$

$$I_{total} = I_{rod} + I_{sleeve} = \frac{\pi}{4}(41 \times 10^{-4}) + \frac{\pi}{4}(1 \times 10^{-4})$$

$$= \frac{\pi}{4}(42 \times 10^{-4})$$

$$E_{composite} = \frac{E_{rod} I_{rod} + E_{sleeve} I_{sleeve}}{I_{total}}$$

$$= \frac{(30 \times 10^6) \frac{\pi}{4}(10^{-4}) + (1.7 \times 10^6) \frac{\pi}{4}(41 \times 10^{-4})}{\frac{\pi}{4}(42 \times 10^{-4})}$$

$$E_{composite} \cong 2.4 \times 10^6$$
$$E_{living\ bone} \cong 2 \times 10^6 \text{ to } 4 \times 10^6$$

The bone pin closely approximates the modulus of living bone. It is located in the marrow of a broken bone in the leg of a man in the manner generally shown in FIG. 6, extending to a distance of about 3 inches on each side of the break. Periodic X-rays show that the bone pin performs excellently. The similarity in rigidity between the pin and living bone allows it to remain firmly and securely implanted within the bone without the toggling which has been found to occur when a stiffer pin is similarly implanted within a bone. The carbon sleeve and Vitallium inner member appear to be completely biocompatible. Normal bone growth in the region surrounding the pin occurs readily.

Various features of the invention are set forth in the following claims.

What is claimed is:

1. A prosthetic device which comprises an outer member having a central longitudinal passageway extending therethrough, an inner member which has a rod portion that is received in said passageway, a head at one end of said rod portion which generally abuts one end of said outer member and means engaging the other end of said rod portion of said inner member, which engaging means has a surface that abuts the opposite end of said outer member, engagement of said engaging means with said rod portion placing said inner member in tension and said outer member in compression, said inner and outer members being joined to each other to form a composite device and said members being physically proportioned so said composite device has a modulus of elasticity closely approaching that of living bone tissue.

2. A prosthetic device in accordance with claim 1 wherein the modulus of elasticity of said outer member is between about $1 \times 10^6$ p.s.i. and $4 \times 10^6$ p.s.i.

3. A prosthetic device in accordance with claim 2 wherein the tensile strength of said rod portion is at least about 50,000 p.s.i.

4. A prosthetic device in accordance with claim 3 wherein the modulus of elasticity of said rod portion is not greater than about $30 \times 10^6$ p.s.i.

5. A prosthetic device in accordance with claim 1 wherein said head of said inner member has a surface which is flush with then end surface of said outer member.

6. A prosthetic device in accordance with claim 1 wherein said outer member is a cylindrical sleeve of circular cross-section, wherein said central passageway is coaxial with said sleeve and of circular cross-section, and wherein the diameter of said rod portion is not greater than about 50 percent of the outer diameter of said sleeve.

7. A device in accordance with claim 1 wherein said head portion of said inner member is formed as a replacement neck and ball section of the human femur and wherein said outer member has a generally frustoconical outer surface.

8. A device in accordance with claim 1 wherein at least the outer surface portion of said outer member is made of a material selected from the group consisting of polycrystalline graphite, vitreous carbon, pyrolytic carbon and a carbonized composite of cloth and thermosetting resin.

9. A prosthetic device in accordance with claim 2 wherein said outer member is made of polycrystalline graphite.

10. A prosthetic device which comprises a first member which is formed as a replacement neck and ball section of the human femur and which has a rod portion extending therefrom of generally constant diameter, a second member having a central longitudinal passageway extending therethrough which receives said rod portion, said second member having a generally frusto conical outer surface, the free end of said rod portion being provided with thread means, and nut means having engaging mating thread means so that said second member can be placed in compression by the relative rotational movement of said nut means and said rod portion and thereby form a composite device, said first and second members being physically proportioned so said composite device has a modulus of elasticity closely approaching that of living bone tissue.

11. A device in accordance with the claim 10 wherein at least the outer surface portion of said second member is made of a material selected from the group consisting of polycrystalline graphite, vitreous carbon, pyrolytic carbon and a carbonized composite of cloth and thermosetting resin.

References Cited

UNITED STATES PATENTS

| 2,622,592 | 12/1952 | Rosenstein | 128—92 |
| 3,314,420 | 4/1967 | Smith et al. | 128—92 |

FOREIGN PATENTS

| 960,010 | 1949 | France | 128—92 |
| 923,383 | 1955 | Germany | 128—92 |
| 1,500,461 | 1967 | France | 3—1 |

RICHARD A. GAUDET, Primary Examiner

J. YASKO, Assistant Examiner

U.S. Cl. X.R.

128—92B, 92 BC, 92 CA